United States Patent
Yamada

(10) Patent No.: US 9,003,273 B2
(45) Date of Patent: Apr. 7, 2015

(54) DOCUMENT CLIPPING WITH LINKED INFORMATION

(75) Inventor: Takafumi Yamada, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 358 days.

(21) Appl. No.: 13/368,590

(22) Filed: Feb. 8, 2012

(65) Prior Publication Data

US 2012/0204087 A1 Aug. 9, 2012

(30) Foreign Application Priority Data

Feb. 8, 2011 (JP) ................... 2011-025094

(51) Int. Cl.
*G06F 3/048* (2013.01)
*G06F 17/22* (2006.01)

(52) U.S. Cl.
CPC .................. *G06F 17/2235* (2013.01)

(58) Field of Classification Search
CPC ................. G06F 3/048; G06F 17/21
USPC ......................................................... 715/205
See application file for complete search history.

(56) References Cited

U.S. PATENT DOCUMENTS

| | | | |
|---|---|---|---|
| 7,519,573 B2* | 4/2009 | Helfman et al. ............. 1/1 |
| 2002/0135806 A1 | 9/2002 | Yoshino | |
| 2003/0068099 A1* | 4/2003 | Chao et al. ............. 382/282 |
| 2007/0106952 A1* | 5/2007 | Matas et al. ............. 715/764 |
| 2009/0265626 A1 | 10/2009 | Suga | |
| 2012/0054597 A1 | 3/2012 | Yamada | |
| 2012/0054637 A1* | 3/2012 | Arrasvuori et al. ........... 715/748 |

FOREIGN PATENT DOCUMENTS

| | | |
|---|---|---|
| GB | 2 332 543 A | 6/1999 |
| JP | 11-237968 A | 8/1999 |
| JP | 2002-351636 A | 12/2002 |
| JP | 2008-287383 A | 11/2008 |
| JP | 2009-258966 A | 11/2009 |

OTHER PUBLICATIONS

Notice of Reasons for Rejection issued in corresponding Japanese Patent Application No. 2011-025094 mailed Jan. 8, 2013.

* cited by examiner

*Primary Examiner* — Kavita Padmanabhan
*Assistant Examiner* — Tionna Burke
(74) *Attorney, Agent, or Firm* — Banner & Witcoff, Ltd.

(57) ABSTRACT

An apparatus receives a first selection command to select a part of an area of a displayed first document (e.g., text, image, etc) as a selected area. When the apparatus receives the first selection command, the apparatus causes display content included in the selected area selected in response to the first selection command to be stored in a storage unit and determines whether link information linked to second document is included in the selected area. The apparatus acquires document data of the second document using the link information in response to determining that the link information is included in the selected area.

18 Claims, 15 Drawing Sheets

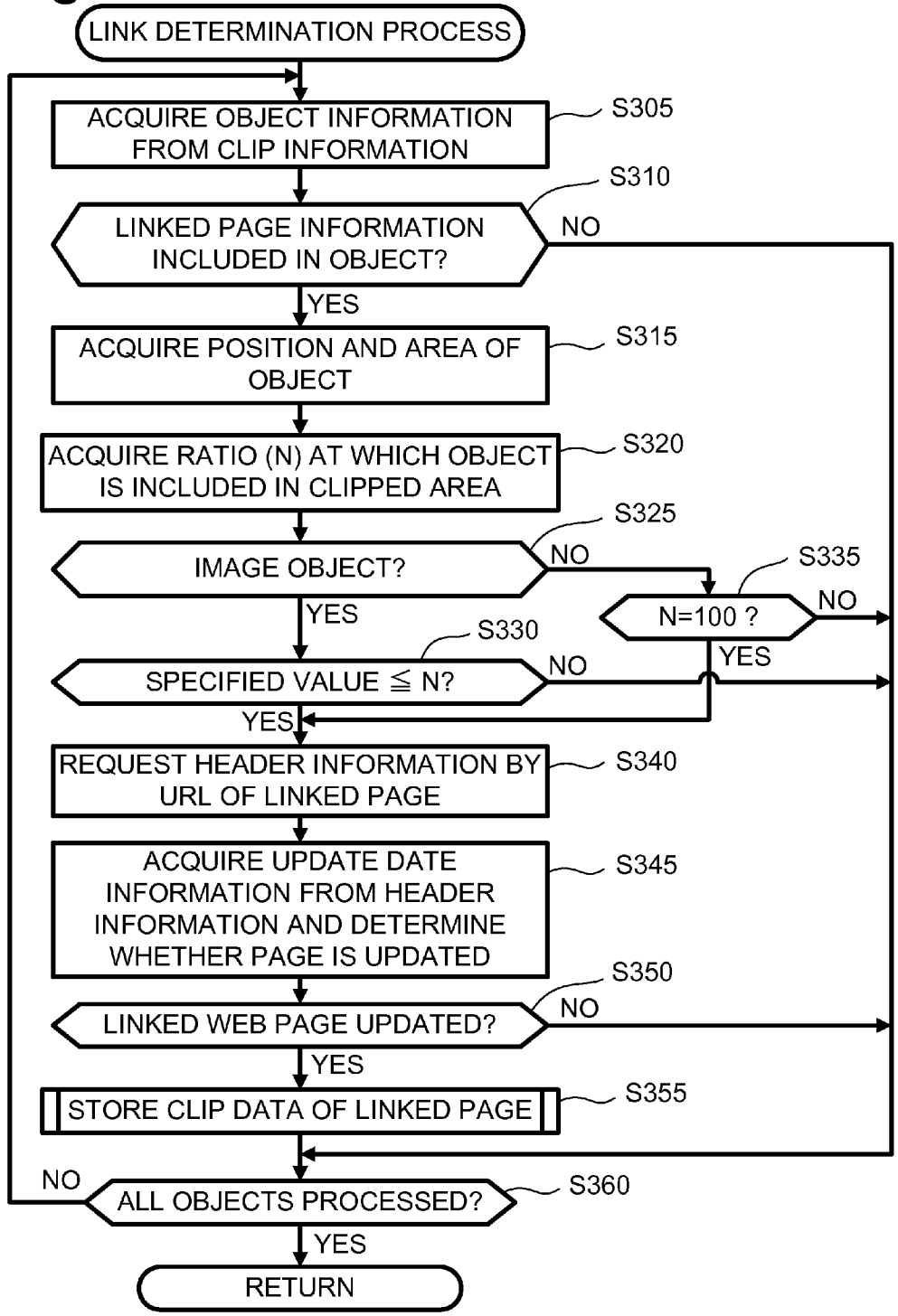

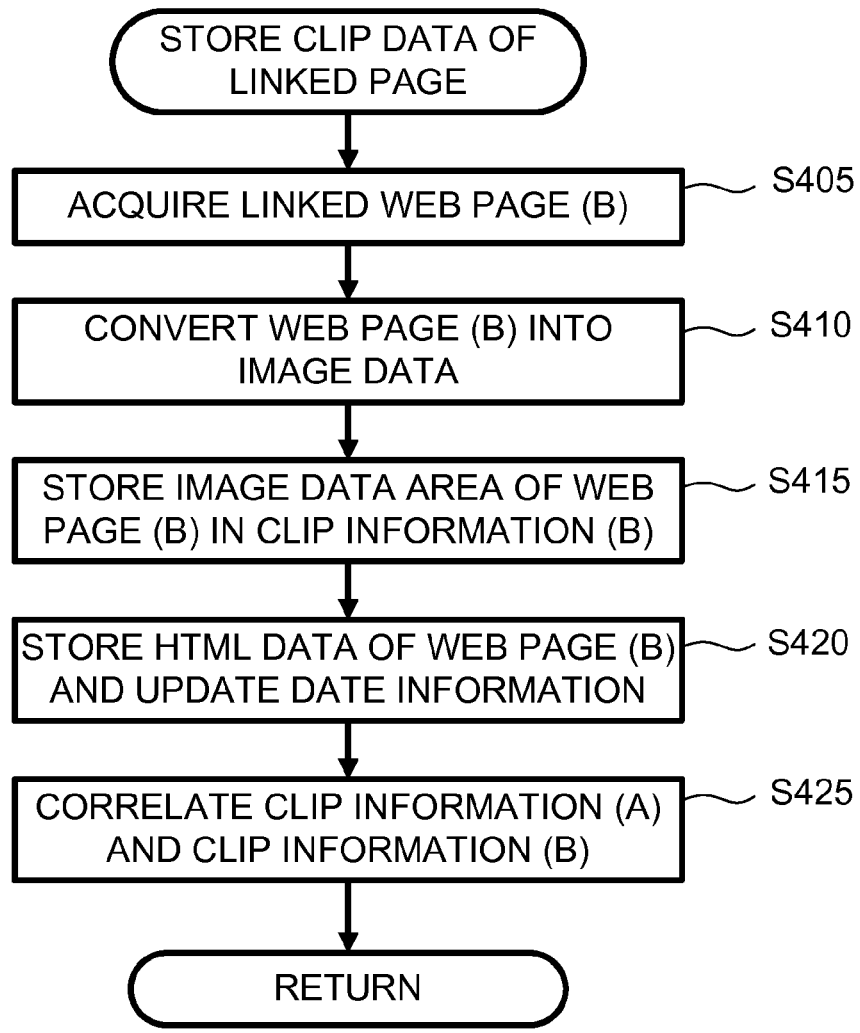

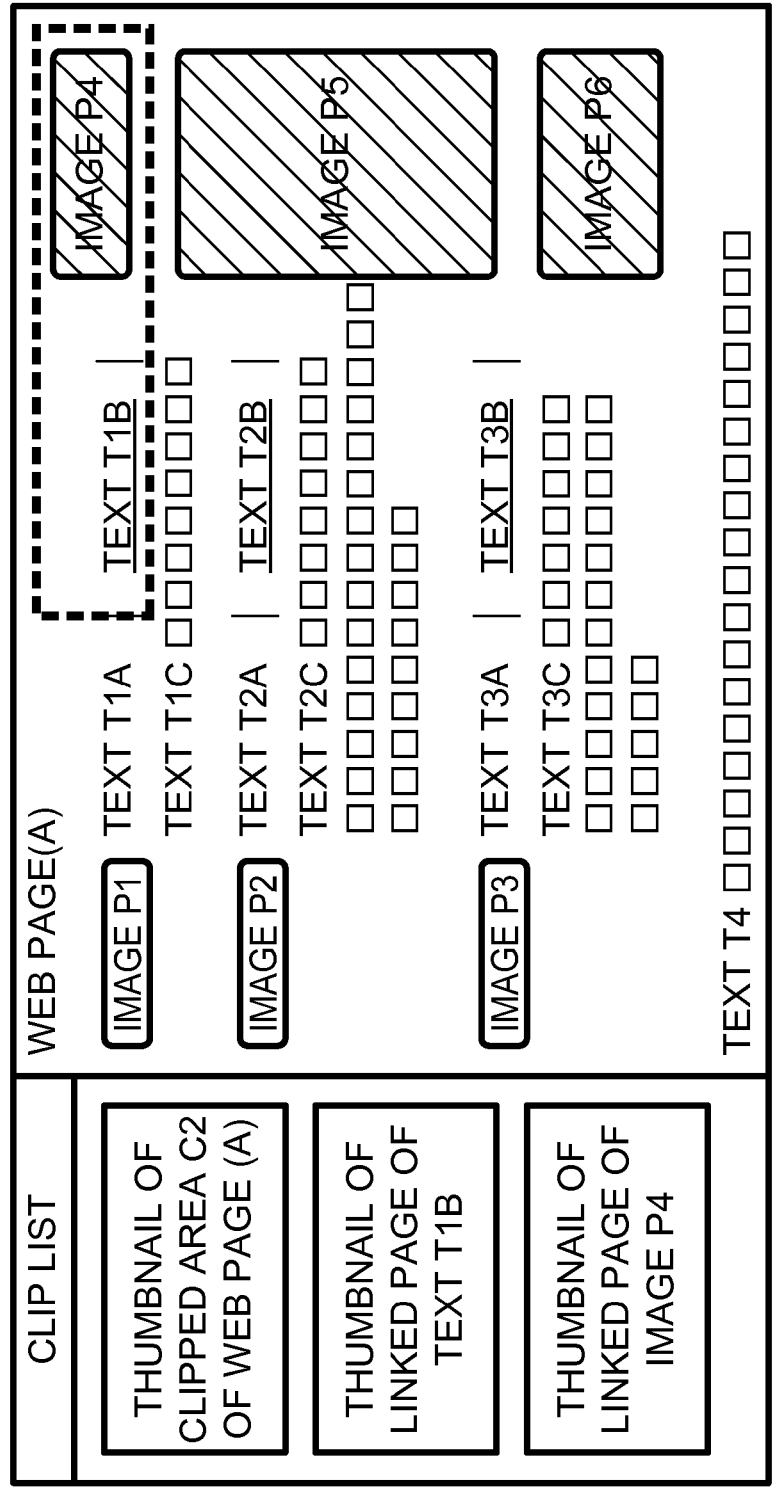

Fig.9A

| | OBJECT《1》 | OBJECT《2》 | ⋮ |
|---|---|---|---|
| POSITION INFORMATION | 10, 10 | 10, 100 | ⋮ |
| AREA | 250, 75 | 40, 75 | ⋮ |
| ATTRIBUTE | TEXT WITH HYPERLINK | IMAGE WITH NO HYPERLINK | ⋮ |
| ENTITY DATA | TEXT T1B | Aaa.gif | ⋮ |
| ENTITY SIZE | | 39, 240 BYTES | ⋮ |
| LINKED PAGE URL | http://www.OOOO.OOO/link_1.html | | |
| BLOCK | | `<div id="weather">` ⋮ ⋮ `</div>` | |
| DISPLAY SIZE | 1024 x 800 | 1024 x 800 | ⋮ |
| CHARACTER SIZE | MAXIMUM | MAXIMUM | ⋮ |
| DISPLAY MAGNIFICATION | 100% | 100% | ⋮ |

Fig.9B

| POSITION INFORMATION | 8, 5 | | |
|---|---|---|---|
| AREA | 290, 100 | | |
| OBJECT | OBJECT《1》 | | |
| URL | http://www.OOOO.OOO | | |
| LINK INFORMATION | LINKED PAGE URL | http://www.OOOO.OOO/link_1.html |
| | CLIP INFORMATION | Clip Data_1 |

Fig.9C

| IDENTIFIER | Clip Data_1 |
|---|---|
| POSITION INFORMATION | 8, 5 |
| AREA | 290, 100 |
| OBJECT | OBJECT《"1"》<br>OBJECT《"2"》 |
| URL | http://www.OOOO.OOO/link_1.html |

DOCUMENT CLIPPING WITH LINKED INFORMATION

CROSS REFERENCE TO RELATED APPLICATION

This application claims priority from Japanese Patent Application No. 2011-025094, filed on Feb. 8, 2011, the entire disclosure of which is incorporated herein by reference.

BACKGROUND

Techniques to clip and print an area selected on a web page (hereinafter, "selected area") and to store the clipped selected area are known.

Some web pages include, for example, a text object as a title and an image object as banner advertising and a thumbnail image, each of which is provided with a hyperlink to another web page.

BRIEF SUMMARY

In the related art, however, even if an object provided with a hyperlink is included in a selected area on a link source web page (or other document), information displayed on a linked web page (or other document) is not stored.

One or more aspects described herein relate to the acquisition of information about a linked web page or other document of a hyperlink if an object provided with the hyperlink is included in a selected area clipped from a link source web page or other document.

According to an aspect, systems, apparatus, computer readable media and methods may be provided for receiving a first selection command to select a part of an area of a displayed web page or other document as a selected area; upon reception of the first selection command by the first selection command receiving unit, causing selected area data indicating displayed content included in the selected area selected in response to the first selection command to be stored in a storage unit; determining, upon reception of the first selection command, whether link information linked to another web page or other document is included in the selected area; acquiring web page data of the other web page from the linked page indicated by the link information upon or in response to determining that the link information is included in the selected area; and a correlating the web page data of the other web page acquired from the linked page with the selected area data and storing the correlated data in the storage unit.

Other objects, features, and advantages will be apparent to persons of ordinary skill in the art from the following description with reference to the accompanying drawings.

BRIEF DESCRIPTION OF THE DRAWINGS

FIG. 4 is a flowchart illustrating an example link determination process;

FIG. 5 is a flowchart illustrating an example process of storing clip data of a linked page;

FIG. 8A is an explanatory view illustrating an example display in a case in which a selected area completely including a text object and an image object is designated;

FIG. 9A is an explanatory view illustrating an example of object information;

FIG. 9B is an explanatory view illustrating example clip information of a link source web page;

FIG. 9C is an explanatory view illustrating example clip information of a linked web page.

DETAILED DESCRIPTION

Embodiments will be described with reference to one or more examples.

System Structure

Figure 1:
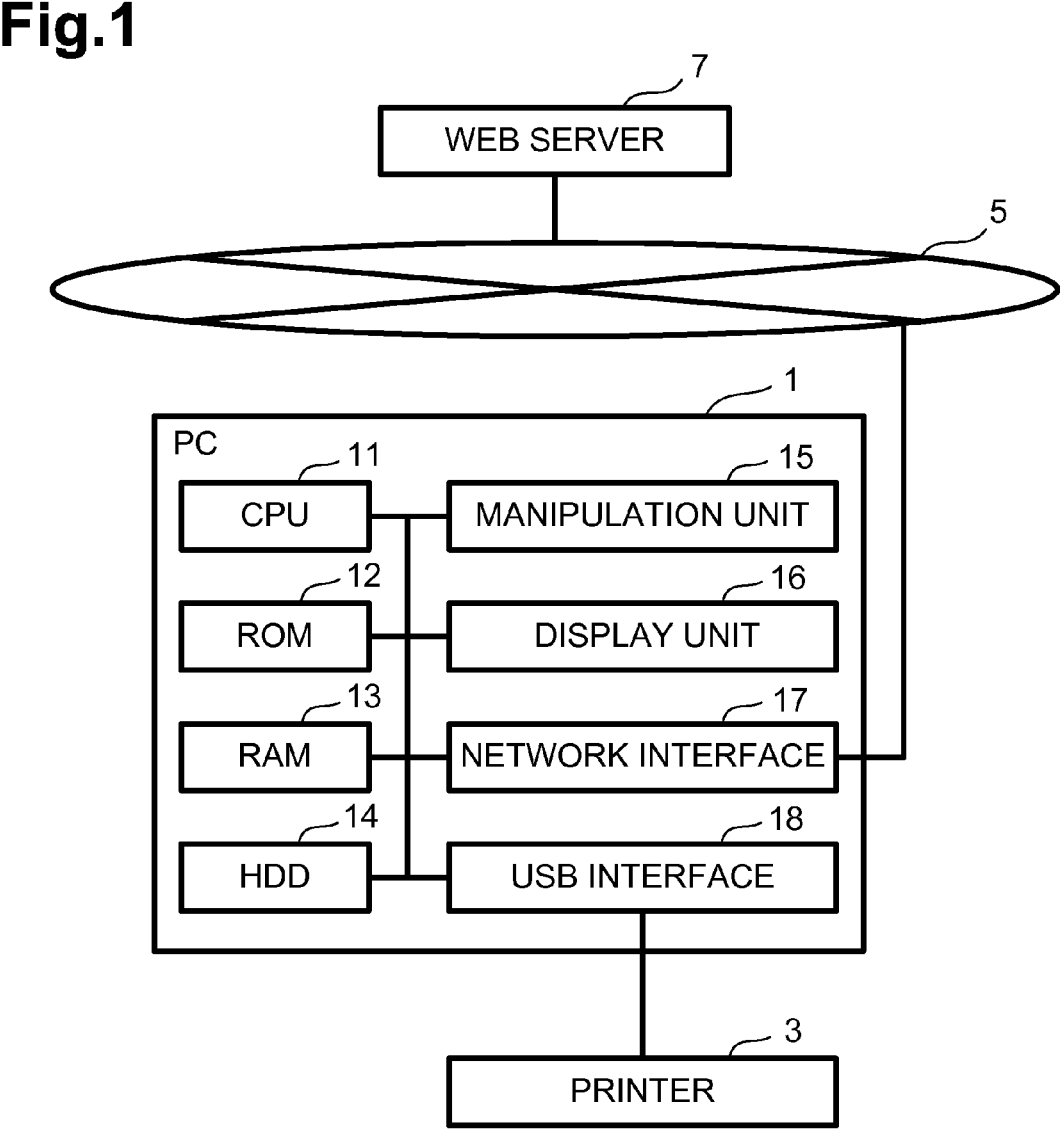
FIG. 1 is a block diagram illustrating an example configuration of a system provided with a PC and a printer.

A system described below is provided with a personal computer 1 (hereinafter, "PC 1") and a printer 3 connected to the PC 1 as illustrated in FIG. 1. The PC 1 can communicate with a web server 7 via a wide area network (WAN; the Internet is as example thereof) 5.

The PC 1 is provided with a CPU 11, ROM 12, RAM 13, a hard disk drive (HDD) 14, a manipulation unit 15, a display unit 16, a network interface 17 and a USB interface 18 as illustrated in FIG. 1.

Various program, such as an operating system (OS), a web browser which is described below and a plug-in incorporated in the web browser, are stored in the HDD 14. Each program is read into the RAM 13 when a process in accordance with these programs (e.g., including computer readable instructions) is executed by the CPU 11.

The manipulation unit 15 is constituted by, for example, a keyboard and various pointing devices (e.g., a mouse). The display unit 16 is constituted by, for example, a liquid crystal display. In the thus-configured PC 1, the web browser can be started by a user manipulation in the manipulation unit 15. After the web browser is started, the user can designate, by the manipulation unit 15, web page data which exists on the web server 7 (e.g., the Uniform Resource Locator (URL) of markup document data written in the Hyper Text Markup Language (HTML), the Extensible HTML (XHTML) and the Extensible Markup Language (XML)) and can request the web server 7 to provide data.

Upon reception of the request, the web server 7 returns the web page data as a response; and the PC 1 acquires the web page data and causes a web page to be displayed on the display unit 16.

After the PC 1 displays the web page on the display unit 16, when the user instructs the PC 1 to print the web page by the manipulation unit 15, the PC 1 can control the printer 3 to print the web page.

The PC 1 has a function to clip a part of the web page displayed on the web browser, and print and store the clip (hereinafter, "clipping function") which will be described in detail below.

With the clipping function, a user can clip a desired range on the web page displayed on the web browser by designating the range and print the clip. Additionally, the clip may be stored and be printed at a later time.

Processes Executed in PC 1

Example processes executed in the PC 1 will be described with reference to flowcharts of FIGS. 2 to 5.

Various expanded functions, other than standard functions, can be added to the web browser incorporated in the PC 1 by installing a program such as a plug-in in the PC 1. The CPU 11 executes a process of the web browser and a process of a plug-in installed in the web browser; these processes cooperate with each other to implement the functions described below. Other types of programs, software, firmware and hardware may be used to provide the web browser, document viewer or other types of browsers and applications.

Figure 2:
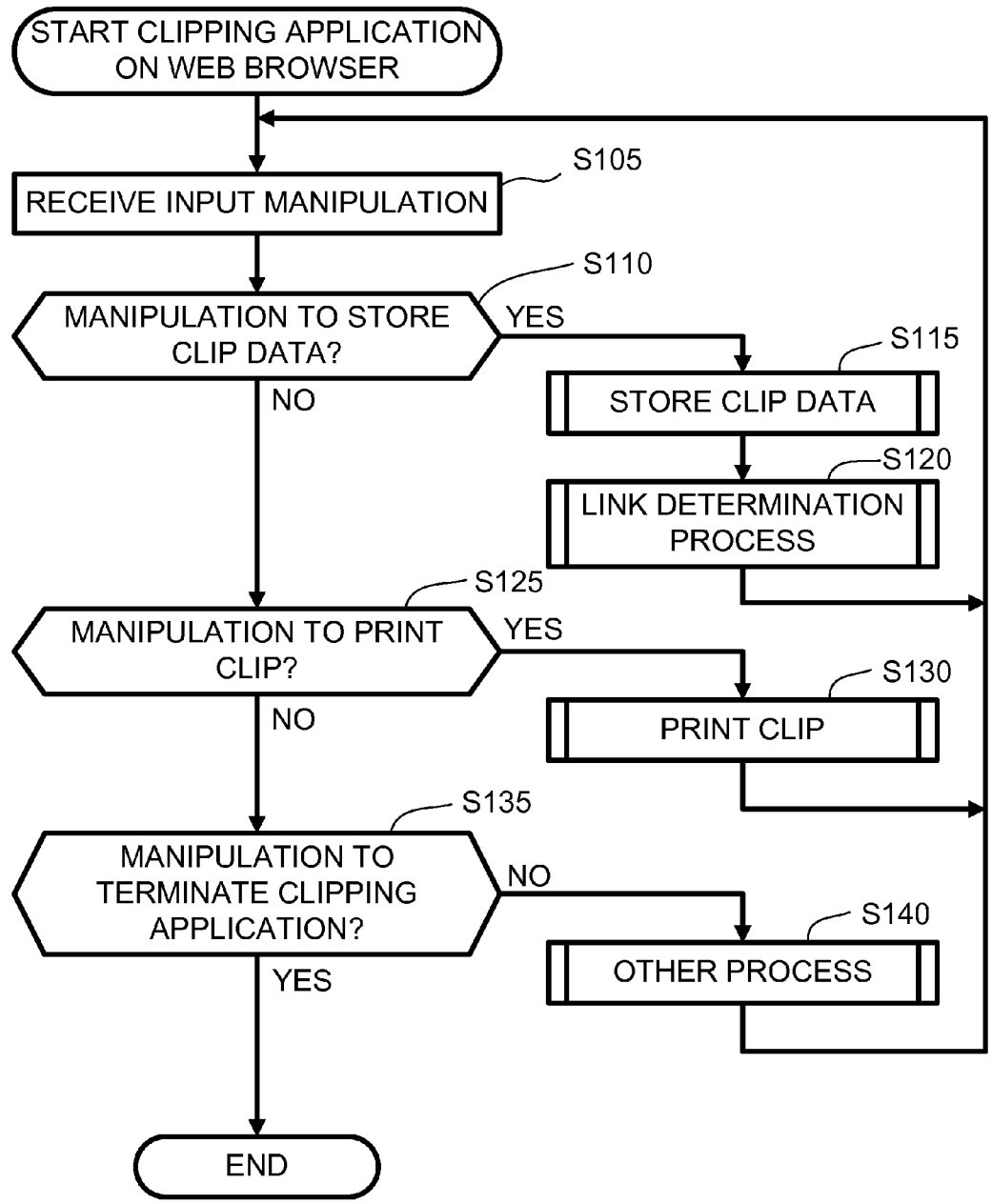
FIG. 2 is a flowchart illustrating an example process after the start up of a clipping application on a web browser.

The process illustrated in FIG. 2 is started when the web browser is started. First, the PC 1 waits for receiving an input manipulation (S105). If the PC 1 receives any input manipulation, the process proceeds to S110.

Next, the PC 1 determines whether the input manipulation received in S105 requests the PC 1 to store clip data (S110). For example, the input manipulation may include selecting a clip option in a document viewer such as a web browser. In other examples, the input manipulation may include activation of a program or selection of a region using a clip tool. If it is determined in S110 that the input manipulation is a request to store clip data (S110: YES), the PC 1 stores the clip data (S115) and executes a link determination process (S120). The process proceeds to S105. Processes of S115 and S120 will be described in detail below.

If it is determined in S110 that the input manipulation is not a request to store clip data (S110: NO), the PC 1 determines whether the input manipulation received in S105 requests the PC 1 to print the clip data (S125). In one example, printing the clip data may be requested by clicking a button on a screen with a pointing device, by a predetermined keyboard manipulation or by other methods. Here, if it is determined that the input manipulation requests the PC 1 to print the clip data (S125: YES), the PC 1 prints the clip data (S130). The process may then proceed to S105.

In S130, a printing process is executed in accordance with text data or image data. Such a printing process may correspond to well known processes executed by using various kinds of software provided with a printing function; thus detailed description thereof will be omitted.

If it is determined that the input manipulation is not a request to print the clip data (S125: NO), the PC 1 determines whether the input manipulation received in S105 requests the PC 1 to terminate the clipping application (S135). For example, terminating the clipping application may be requested by clicking a button on a screen with a pointing device, by a predetermined keyboard manipulation or by other methods.

If it is determined that the input manipulation is not a request to terminate the clipping application (S135: NO), the PC 1 executes other processes (S140) and the process proceeds to S105. Other various processes may be executed in S140. If it is determined that the input manipulation requests the PC 1 to terminate the clipping application (S135: YES), the process illustrated in FIG. 2 is terminated.

Details of Process of Storing Clip Data

Figure 3:
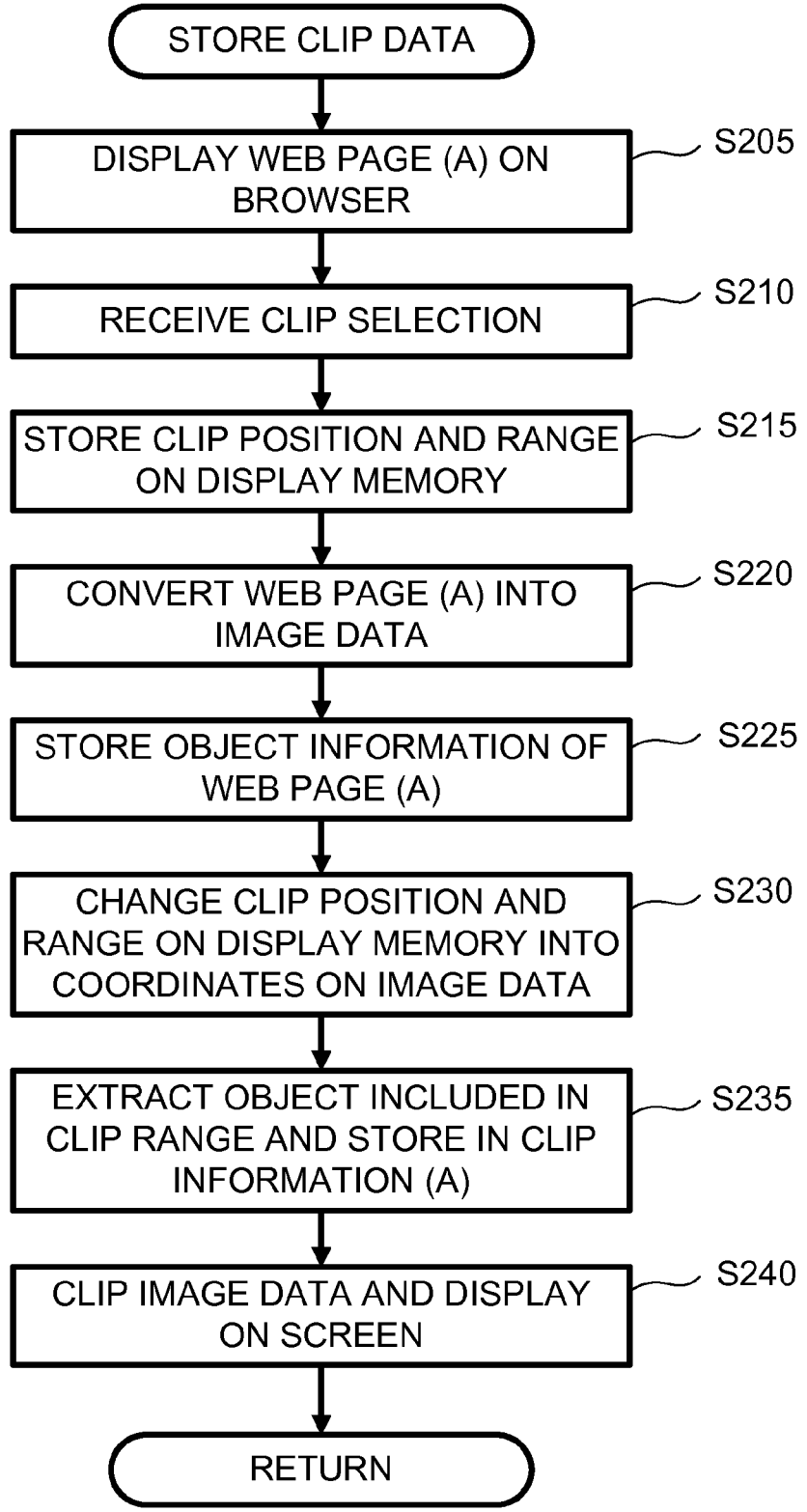
FIG. 3 is a flowchart illustrating an example process of storing clip data.
Figure 6A:
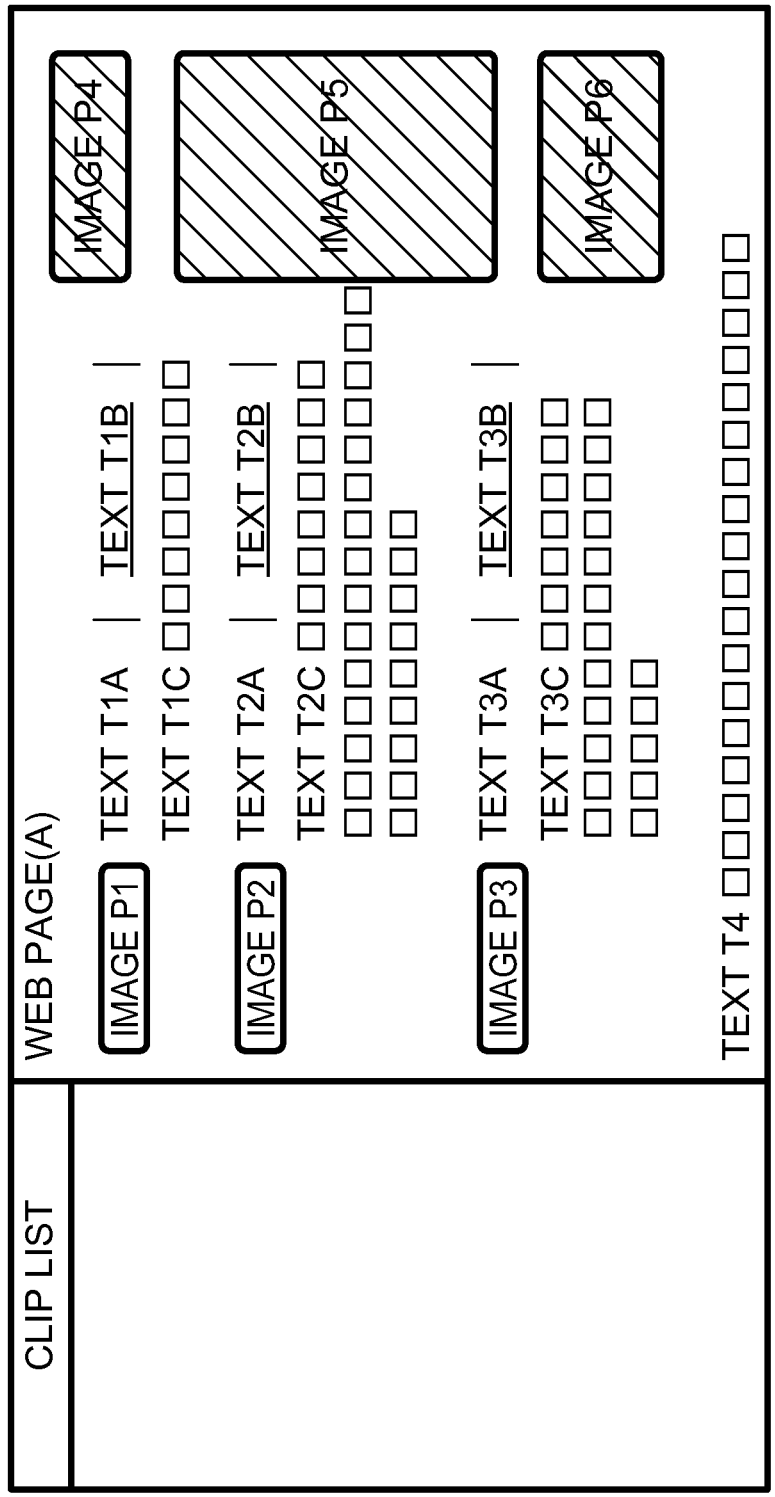
FIG. 6A is an explanatory view illustrating an example display of a web page (A) which is a link source web page.

Details of the example process in S115 will be described with reference to the flowchart of FIG. 3. First, the PC 1 displays a web page (A) which is a link source web page on the web browser (S205). An exemplary web page (A) is illustrated in FIG. 6A. The web page (A) includes objects, such as images P1 to P6, pieces of text T1A to T1C, T2A to T2C, T3A to T3C and T4.

A part of the text and the image included in the web page (A) is provided with a hyperlink. For example, the text T1B is provided with a hyperlink to a web page (B) illustrated in FIG. 6B. Other types of links or document location identifiers may be used including FTP identifiers, file system paths of local documents and the like.

Figure 6B:
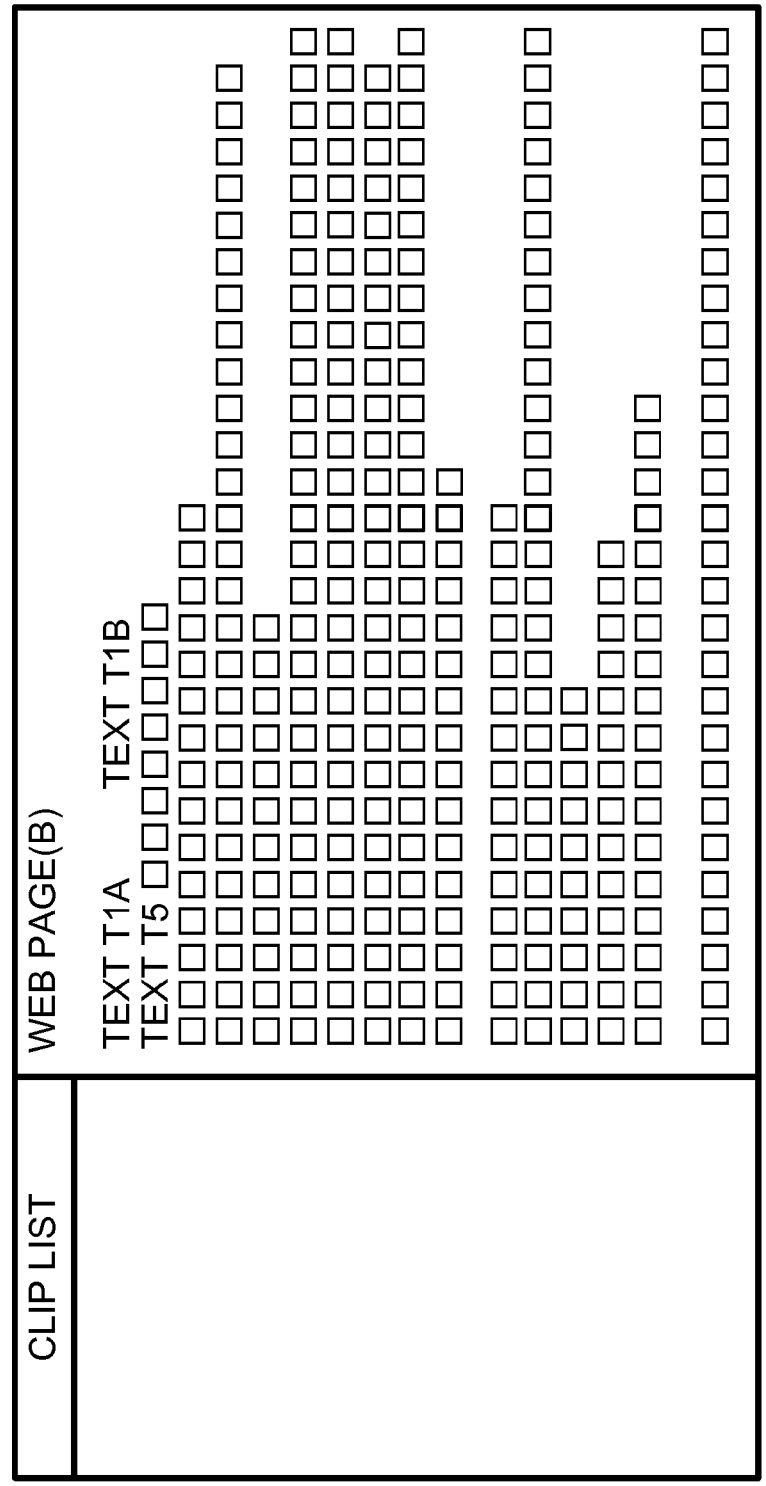
FIG. 6B is an explanatory view illustrating an example display of a web page (B) which is a linked web page.

A pane for displaying the clip as a thumbnail is included in the display area of the web browser (a left side area of the screen illustrated in FIGS. 6A and 6B ("clip list")). The clip is clipped in a process described in further detail below.

Subsequently, the PC 1 waits for an instruction from the user to select a desired clip (S210). In this state, the user can designate a predetermined area on the web browser and select a desired clip.

In particular, in the present example embodiment, a user may point at a desired point on the web browser using a pointing device, press a button of the pointing device at the position, and drag the pointing device while continuously pressing the button. Thus, the PC 1 detects and/or receives a series of user manipulation.

Figure 7A:
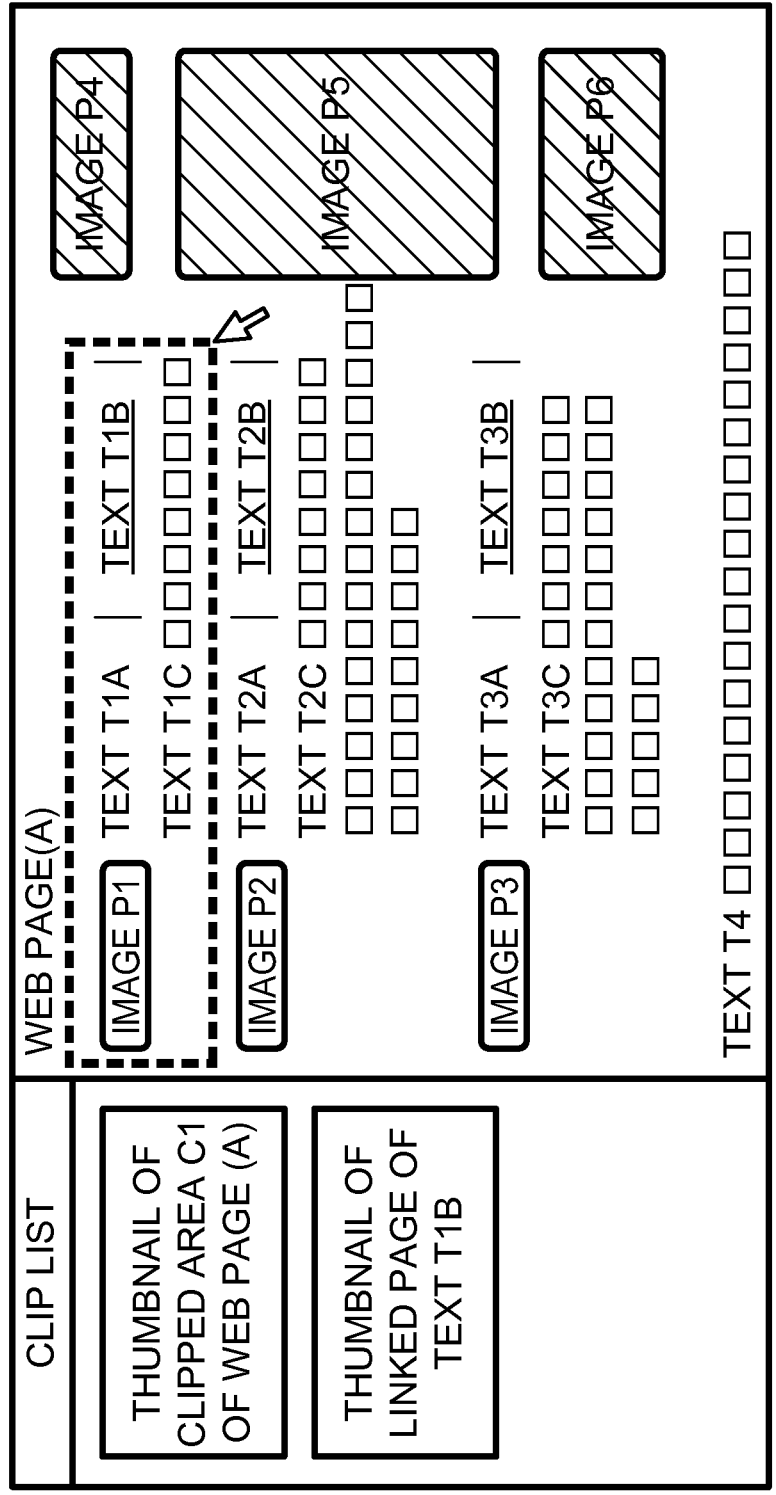
FIG. 7A is an explanatory view illustrating an example display after a selected area is designated on a link source web page.

With such a series of user manipulation, a dash-lined guide frame as illustrated in FIG. 7A may be displayed against the web browser. This guide frame may be a rectangular area of which diagonal line is a line segment connecting a position at which the user has pressed the button and a position which the user has pointed using a pointing device. Other shapes, sizes and guide frame appearances may be used as desired.

Since the position to which the pointing device is pointed by the user is moved when dragged, vertical and horizontal dimensions of the guide frame are changed in accordance with the movement of the position pointed by the pointing device. When the user stops pressing the button of the pointing device at a desired point, the dimension of the guide frame is set or defined (e.g., no further change is made based on the movement of the pointing device). An area inside the guide frame is selected as a clip.

Upon reception of the user manipulation in S210, the PC 1 stores the clipping position and the clipping range on the display memory (S215). That is, since the guide frame is manipulated on the display area, the clipping position and the clipping range are stored in S215 as coordinates in the display memory corresponding to the display area.

Subsequently, the PC 1 converts the web page (A) into image data (S220). In the process of converting the web page (A) into image data, various settings of the web browser are referred to and, in accordance with the settings, the size of characters, vertical and horizontal width of a drawing area on the memory and other settings are determined.

When characters and images are drawn in the drawing area on the memory in accordance with the web page data, the web page (A) illustrated in the right area of FIG. 6A is drawn in the drawing area.

The PC 1 stores object information of the web page (A) (S225). The object information is an information group as illustrated in FIG. 9A. Information about all the objects in the web page (A) is included in the information group on an object basis included in web page (A). Objects may refer to a variety of elements in a document. Objects can correspond to a word, a character, an image, a portion of an image, a paragraph, a sentence, a tag, symbols and the like. In one example, objects may correspond to an element of a document in which a link may be included.

A relatively large block may be regarded as a unit of object or a small, subdivided block may be regarded as a unit of object. In any of these cases, fundamentally, the web page data is analyzed and the object is clipped in accordance with a tag included in the analyzed web page data.

For example, when a relatively large block is regarded as a single object, an object can be clipped with exemplary tags <div> to </div> as a clipping unit. Alternatively, an object can be clipped as a subdivided clipping unit in accordance with other tags (e.g., "<li> to </li>," "<span> to </span>," "<a> to </a>," and "<p> and </p>).

In news content, which may include text data with many characters, the number of characters in the text may be counted and the text data may be clipped as an object for a predetermined number of characters (e.g., 20 characters). Alternatively, if a tag indicating end-of-line in the consecutive characters is included in the text, an object may be clipped in accordance with the tag.

That is, it might only be necessary to define a range of an object previously, and an object is clipped in accordance with a predetermined rule. Object information is stored on the clipped object basis in S225.

After the process in S225 is terminated, the PC 1 converts the clipping position and the clipping range in the display memory into coordinates of the image data (S230). In some cases, the clipping position and the clipping range on the display memory are coordinates set in accordance with the resolution for display; in contrast, the image data of the web page (A) has coordinates set in accordance with the resolution for printing. Therefore, in S230, coordinates, on the image data of the web page (A), corresponding to the clipping position and the clipping range defined on the display memory in accordance with the user manipulation are acquired through calculation.

Subsequently, the PC 1 extracts the object included in the clipping range and stores the object in the clip information (A) (S235). Exemplary clip information (A) is illustrated in FIG. 9B. FIG. 9B illustrates a case in which a single object <<1>> is included in the clipping range; if, however, a second or more objects <<2>>, <<3>> and so on are included in the clipping range, the information of the additional objects is also stored in the clip information (A).

Upon termination of these processes, the PC 1 clips the clip from the image data and displays the clip on a screen (S240). Here, the process illustrated in FIG. 3 is completed. In S240, a thumbnail of the clip is displayed on the pane for displaying the clip. The thumbnail displayed here is a "thumbnail of a clipped area C1 on the web page (A)" illustrated in FIG. 7A. The displayed content is a reduced image of the portion indicated by a dashed line in FIG. 7A. The thumbnail is used when the user selects an object to be viewed or printed later.

Details of Link Determination Process

Details of the example process in S120 will be described with reference to the flowchart of FIG. 4. First, the PC 1 acquires information about an object from the clip information (A) stored in S235 (S305). In S235, as described above, if there is a plurality of objects included in the clipped area, all of the pieces of information are stored in the clip information (A). In S305, a single object which is not yet processed is selected and information corresponding to the selected object is acquired.

The PC 1 determines whether linked page information is included in the object acquired in S305 (S310). If it is determined that linked page information is included in the object (S310: YES), i.e., if a hyperlink is set to the object selected in S305, the PC 1 acquires the position and the area of the object (S315).

The PC 1 acquires a ratio (N) of the object with respect to the entire clipped area (S320). In particular, the position of the object acquired in S315 is defined by coordinates of the upper left corner of the rectangular area, where the object is located. The area is defined by the number of pixels in the vertical and horizontal directions of the rectangular area. Similarly, the position and the range of the clipped area is defined by coordinates of the upper left corner of the rectangular area and the number of pixels in the vertical and horizontal directions.

In accordance with such information, the PC 1 acquires in S320 an overlapping range of these two rectangular areas and calculates the ratio (N)=(the number of pixels included in the overlapping range)/(the number of pixels included in the area of the entire object).

The PC 1 determines whether the object to be processed is an image object (S325). In S325, the PC 1 refers to the object information (see FIG. 9A) corresponding to the object to be processed. If a file name in the "entity data" included in the object information is a file name of an image file, the PC 1 determines that the object to be processed is an image object.

Whether the file name is of the image file can be determined by extensions (e.g., ".bmp", ".jpg", ".gif" and ".png". Alternatively, if the entity data stored in the object information is a file which appears to be a file name of an image file, the file may be opened to check, for example, file header information and a file data structure. Image data may also be identified based on tags in the web page.

If it is determined in S325 that the object to be processed is an image object, (S325: YES), the PC 1 determines whether the ratio (N) is equal to or higher than a specified value (specified value≤N) (S330). The specified value used in S330 can be selected arbitrarily in advance and is 50% in the present example embodiment. If the object to be processed is an image object and a number of pixels greater than 50% of the entire image object is included in the clip area, the determination result of S330 is affirmative (S330: YES) in the present embodiment.

If it is determined that the object to be processed is not an image object (S325: NO), the object to be processed is regarded as a text object and it is determined whether the ratio (N) is 100% (N=100) (S335). If the object to be processed is a text object, the determination result of S335 is affirmative (S335: YES) only if the number of pixels of 100% of the entire text object is included in the clip area (S335: YES).

In the present embodiment, determination in S325 is made on the basis whether the object is the image object or the text object. If, however, there are objects of other kinds than the image object and text object, determination of S330 or S335 may be made for each kind of object. If the object is a text object, it is determined in S335 whether the ratio (N) is 100% (N=100); however, it is also possible to determine whether the ratio (N) is in a range between a value greater than 50% and a value not greater than 100% (50<N≤100). Various other ranges or thresholds may be used as desired.

In the present embodiment, affirmative determination in S330 or S335 means that linked page information is included in the object. Negative determination in S330 or S335 means that no linked page information is included in the object.

That is, it is determined that no linked page information is included in that object if less than 50% of the entire image object is included in the clipped area and less than 100% of the entire text object is included in the clipped area. For example, different or the same thresholds may be used between different types of objects (e.g., image objects vs. text objects).

For example, if a range defined by a dashed line in FIG. 8A is designated as a clipped area, the entire "text T1B" which is a text object is included in the clipped area and the entire "image P4" which is an image object is included in the clipped area. Accordingly, it is determined in this case that the linked page information is included in both objects.

Figure 8B:
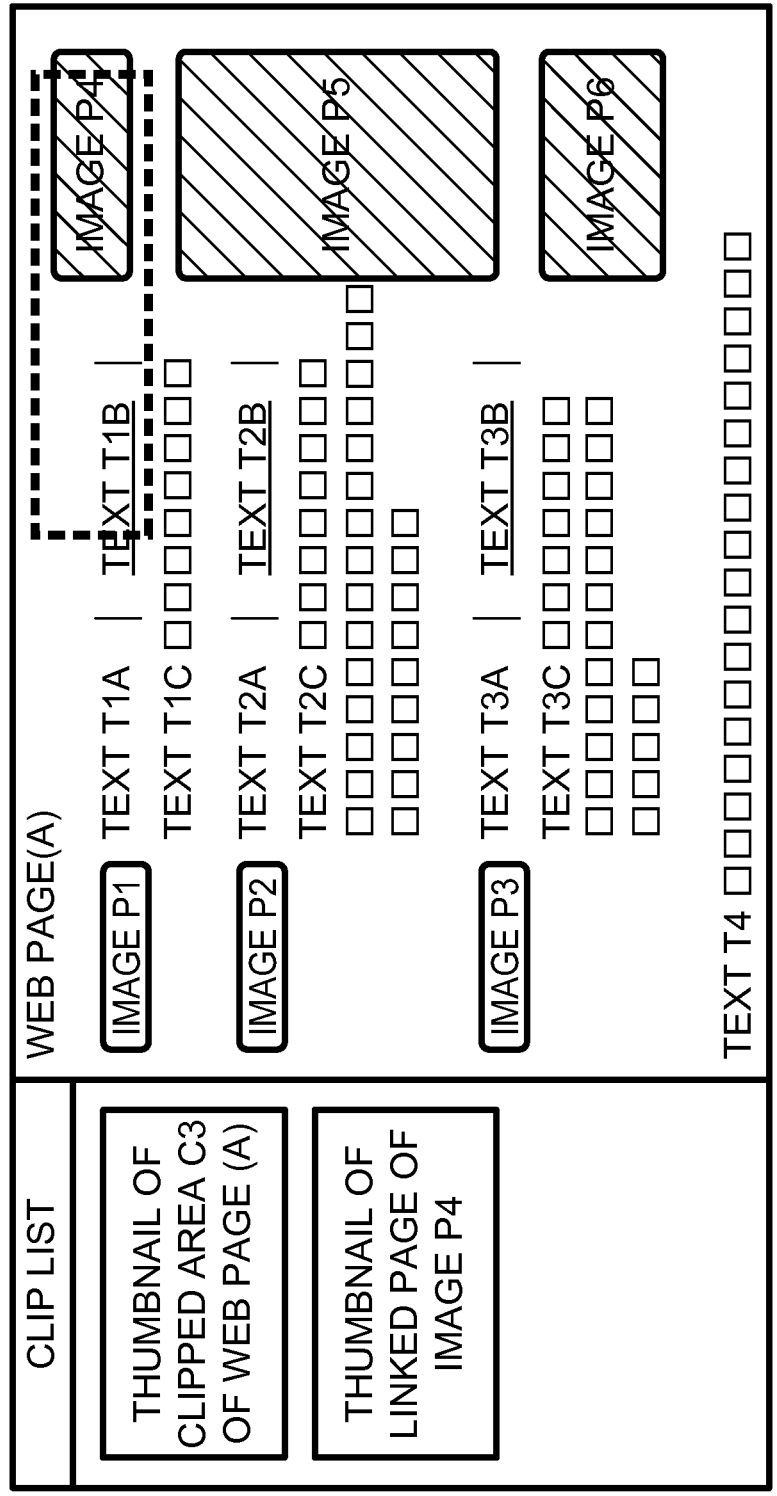
FIG. 8B is an explanatory view illustrating an example display in a case in which a selected area including a part of a text object and a part of an image object is designated.

If a range defined by a dashed line in FIG. 8B is designated as a clipped area, the "text T1B" which is a text object has a small area which is not included in the clipped area and the "image P4" which is an image object has a small area which is not included in the clipped area. In this case, it is determined that the "text T1B" includes no linked page information because less than 100% of the text object is within the clip area while the "image P4" may be identified as including linked page information because 50% or more of its area is included in the clip area.

With such determinations, regarding the text which is broken and thus cannot be read the entire thereof, linked page information can be regarded as unnecessary and regarding the image of which a small area such as a margin is outside the clip area is, linked page information is regarded as necessary. For example, broken text may refer to an incomplete word or incomplete selection of a word.

If it is regarded through the determination method described above that linked page information is included in the object (S330: YES or S335: YES), the PC 1 requests header information using an identification such as an URL of the linked page (S340).

Since the header information returned, in response to this request, from the web server 7 to the PC 1 includes updated date information of the linked web page, the PC 1 acquires the updated date information from the header information, and determines whether the page is updated (S345).

If data of the linked web page has not been previously acquired, it is determined in S345 that the page has been updated. If the PC 1 has already acquired the data of the linked web page, but the date of the linked web page has been updated, it is determined that the page has been updated. In contrast, if the PC 1 has already acquired the data of the linked web page and the date of the linked web page has not been changed, it is determined that the page has not been updated.

If the linked web page has been updated (S350: YES), the clip data of the linked page is stored (S355). Details of S355 will be described below.

Termination of S355 may include the PC 1 terminating the process of a single object selected in S305. The PC 1 determines whether all the objects have been processed (S360). If no linked page information is included in the object in S310, (S310: NO), processes of S315 to S355 are unnecessary and the process proceeds to S360. If the determination result of S330 or S335 is negative (S330: NO or S335: NO), the processes of S340 to S355 are unnecessary and the process proceeds to S360. If it is determined in S350 that the linked web page has not been updated (S350: NO), the process of S355 is unnecessary and the process proceeds to S360.

If it is determined in S360 that not all the objects have been processed (S360: NO), the process returns to S305 and the processes of S305 to S355 are repeated from the next object be processed. If it is determined in S360 that all the objects have been processed (S360: YES), the link determination process illustrated in FIG. 4 is terminated.

Details of Process of Storing Clip Data of Linked Page

Details of S355 will be described with reference to the flowchart of FIG. 5. First, the PC 1 acquires the linked web page (B) in accordance with the linked page information (S405) and converts the web page (B) into image data (S410). When the PC 1 converts the web page (B) into image data, the PC 1 refers to various settings in the web browser and determines, for example, the size of the character, the width of the drawing area on the memory in the vertical and horizontal direction in accordance with these settings.

The web page (B) as illustrated in the right area of FIG. 6B is drawn in the drawing area on the memory by drawing characters and images in accordance with web page data.

The PC 1 stores the entire web page (B) as a single clipped area in the clip information (B) (S415) and stores HTML data of the web page (B) and the update date information (S420). Various pieces of information about the linked web page (B) are stored when the clipped area is selected on the link source web page (A) in S415 and S420.

After the various pieces of information are stored, the PC 1 stores the clip information (A) and the clip information (B) in a correlated manner (S425) and terminates the process illustrated in FIG. 5. In S425, the same identifier (e.g., ClipData_1 illustrated in FIG. 9C) is registered in a clip information column prepared in the link information column of the clip information (A) and in an identifier column prepared in the clip information (B). Therefore, in accordance with the identifier read from either one of the clip information (A) or the clip information (B), the other of the clip information in which the same identifier is registered can be specified.

The image of the web page (B) is displayed on the pane for displaying the clip as a thumbnail image. The thumbnail image displayed here is a "thumbnail image of linked page of text T1B" illustrated in FIG. 7A, and is a reduced image of the entire web page (B).

Figure 7B:
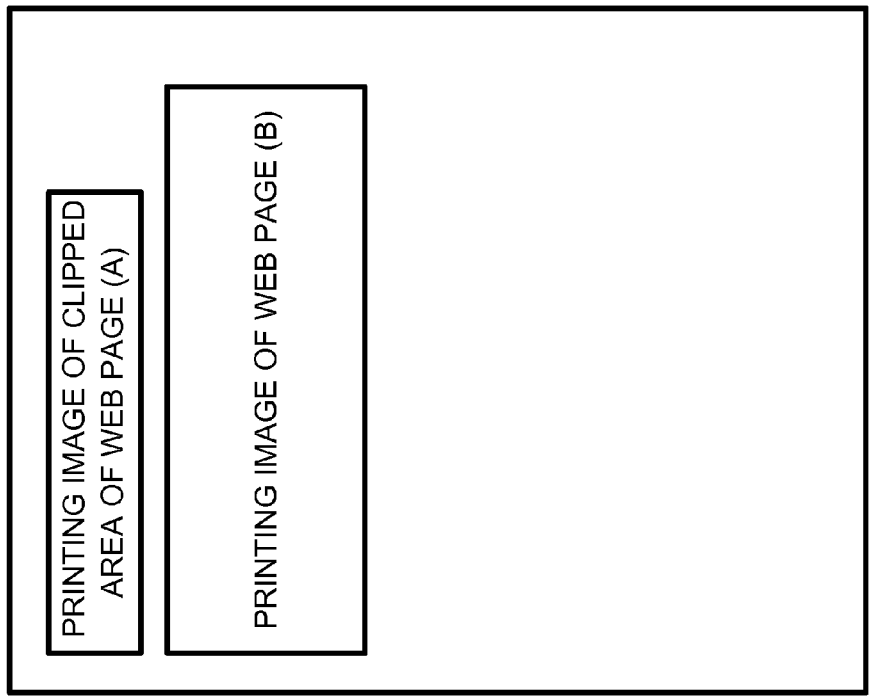
FIG. 7B is an explanatory view illustrating an example of printing of clip data.

The thumbnail images displayed on the pane for displaying the clip can be printed in an arbitrarily combined manner. For example, when the user gives an instruction to select and print two thumbnail images illustrated in FIG. 7A, a printing matter as illustrated in FIG. 7B is printed in the process in S130 described above.

The PC 1 which executes the processes described above acquires, when the user gives an instruction for selecting a part of the area of the web page (A) as a clipped area, if the link information linked to another web page (B) is included in the clipped area, the web page data of the other web page (B) is acquired from the linked page indicated by the link information, and the web page data is correlated with the clipped area and is stored.

Therefore, if the user wants to store the linked web page (B) indicated by the link information in the clipped area when a part of the web page (A) is clipped, it is not necessary for the user to perform a manipulation to display the linked web page (B) and to store the displayed web page (B) in addition to the manipulation to store the clip area. Therefore, the manipulation before the termination of the process can be simplified and easy.

If the ratio of a part of the object included in the clipped area is higher than a certain ratio in S325 to S335, the PC 1 acquires the web page data of the web page (B) from the linked page indicated by the link information set in the object and then stores the same. If the ratio of a part of the object included in the clipped area is lower than a certain ratio, no web page data is acquired from the linked page indicated by the link information set in the object.

Therefore, if only a small amount of an object is included in the clipped area, the PC 1 does not acquire the web page data from the linked page indicated by the link information set in the object. Thus, the PC 1 can avoid acquiring unnecessary web page data without requiring any excessively exact manipulation.

In such a link determination process, a reference value for link determination is changed depending on the kind of objects. Thus, it is possible to provide a detailed determination as to whether the PC 1 acquires the linked web page (B). In particular, broken text in the text object often has no more complete meaning whereas the image object often has no problem if a peripheral portion, such as a margin, is out of the clipped area as long as a main portion is included in the clipped area. Accordingly, by properly adjusting the reference value for determination of the text object and the image object, it is possible to collect useful information and avoid acquiring unnecessary information.

When the PC 1 acquires a web page from a plurality of linked pages with reference to a plurality of pieces of link information, with the processes of S340 to S350, if the web pages are the same as those acquired and stored, the PC 1 does not acquire the web page data and shares the already stored web page data with other clipped areas. Since the PC 1 does not repeatedly acquire and store the same web page data, the storage area can be used effectively.

An exemplary embodiment of the present invention has been described above, but the embodiment is not limited thereto. Aspects described herein can be implemented with other features.

For example, the linked web page (B) is stored as the entire web page (B) in the embodiment described above; however, the user may also select an area on the linked web page (B) and only the selected clipped area may be stored.

Figure 10:
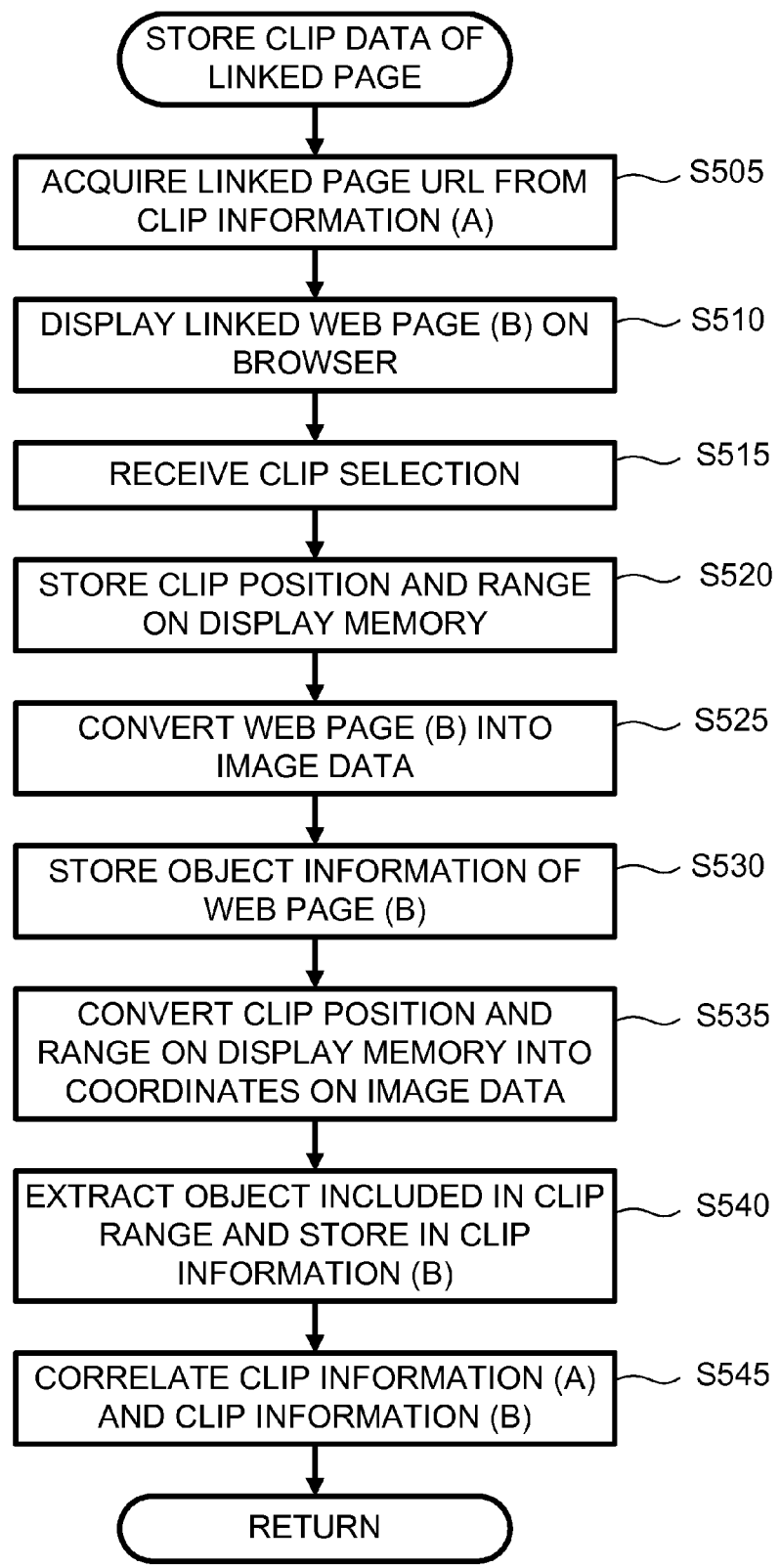
FIG. 10 is a flowchart illustrating another example process of storing clip data of a linked page.

In particular, the user can select an area on the linked web page (B) with, for example, the process illustrated in FIG. 10 in place of the process illustrated in FIG. 5.

That is, in the process illustrated in FIG. 10, the PC 1 first acquires the linked URL from the clip information (A) (S505) and displays the linked web page (B) on the browser (S510).

Then, the user designates the clipping range on the linked web page (B). The PC 1 extracts the object included in the specified clip within and stores the object in the clip information (B) (S515 to S540). Since the procedures of S515 to S540 are substantially the same as those of S210 to S235 illustrated in FIG. 3, detailed description thereof will be omitted.

After the PC 1 stores the clip information (B), the clip information (A) and the clip information (B) are correlated with each other and stored (S545). The process illustrated in FIG. 10 is then terminated. With this process, only a part of the linked web page is stored as a clipped area in a manner similar to the linked web page, and thus it is possible to reduce the amount of data to be stored as compared with a case in which the entire linked web page is stored and it is possible to avoid storing unnecessary information.

If the configuration in which the user selects the clipped area on the linked web page (B) as described above, whether the link information is included also in the clipped area selected on the linked web page (B) may be determined and, if the link information is included, the entire web page (C) which is a linked page or the clipped area on the web page (B) may be stored.

That is, the linked web page may be recursively used as a new link source web page and the clipped area may be repeatedly selected. With this configuration, the user can repeatedly select the clipped area on a plurality of web pages by moving among the linked pages.

In the embodiment described above, the PC 1 acquires the linked web page without user manipulation. However, the embodiment may further include a process step to ask the user as to whether the PC 1 acquires the linked web page.

In this case, the user may respond to the inquiry of the PC 1 not to acquire the linked web page. Thus, the PC 1 may avoid performing a process step for acquiring the linked web page such that the PC 1 does not acquire an unnecessary linked web page. Whether such an inquiry is issued may be determined by the user.

In the embodiment described above, programs causing the PC 1 to execute the processes described above are provided in the web browser as plug-in programs; however, the browser itself may be provided with a function to execute the processes described above.

In the embodiment described above, the PC 1 and the printer 3 are provided as separate devices; however, one configuration may be applied to an integrated apparatus in which a user interface which is equivalent to the PC 1 is incorporated in the printer 3.

In the embodiment and modifications described above, the PC 1 or the CPU 11 corresponds to an exemplary computer. The CPU 11 which executes the operation of S210 corresponds to an exemplary selection command receiving unit. The CPU 11 which executes the operations of S215, S225 and S235 corresponds to an exemplary selected area data storage control unit of aspects described herein. The CPU 11 which executes the operations of S310, S330 and S335 corresponds to an exemplary determination unit of aspects described herein. The CPU 11 which executes the operation of S405 corresponds to an exemplary linked page data acquisition unit of aspects described herein. The CPU 11 which executes the operations of S415, S420 and S425 corresponds to an exemplary linked page data storage control unit of aspects described herein. The CPU 11 which executes the operation of S325 corresponds to an exemplary specifying unit of aspects described herein.

While has aspects have been described connection with various exemplary structures and illustrative embodiments, it will be understood by those skilled in the art that other variations and modifications of the structures and embodiments describes above may be made without departing from the scope of the invention. Other structures and embodiments will be apparent to those skilled in the art from a construction of the specification or practice of the invention disclosed herein. It is intended that the specification and described examples are illustrative with the true scope of the invention being defined by the following claims.

What is claimed is:

1. An apparatus comprising:
 a processor configured to control the apparatus to:
  receive a first selection command to select a part of an area of a displayed first document as a selected area;
  in response to receiving the first selection command:
   causing display content included in the selected area selected in response to the first selection command to be stored in a storage unit;
   determine whether a threshold amount of link information linked to a second document is included in the selected area; and
   acquire document data of the second document using the link information in response to determining that the threshold amount of link information is included in the selected area and without requiring user interaction with the link information in the selected area;
  execute a web browser having a browser window; and
  display a thumbnail corresponding to the acquired document data of the second document together with a thumbnail corresponding to the display content of the selected area of the first document, in one region of the browser window.

2. The apparatus according to claim 1, wherein the apparatus is further caused to:
 generate a correlation between the acquired document data of the second document and the display content of the selected area of the first document; and
 store the correlation in the storage unit.

3. The apparatus according to claim 1, wherein the link information is included in an object of the first document, wherein the selected area includes at least a portion of the object and at least a portion of the link information, and wherein the apparatus is further caused to:
determine a ratio of the at least a portion of the object to an entirety of the object;
in response to determining that the ratio is higher than a predetermined threshold value, determine that the threshold amount of link information is included in the selected area; and
in response to determining that the ratio is lower than the threshold value, determine that the threshold amount of link information is not included in the selected area and not acquiring the document data for the second document.

4. The apparatus according to claim 3, wherein the apparatus is further caused to:
determine a type of the object; and
determine, in accordance with the type of the object, the predetermined threshold value.

5. The apparatus according to claim 4,
wherein the type of the object is at least one of an image and text, and wherein the predetermined threshold value corresponds to a first threshold value when the type of the object is text and wherein the predetermined threshold value corresponds to a second threshold value when the type of the object is an image, wherein the first threshold value is larger than the second threshold value.

6. The apparatus according to claim 4,
wherein when the type of the object is text, the predetermined threshold value is 100%.

7. The apparatus according to claim 1,
wherein the link information is included in an object of the selected area of the first document, and wherein the apparatus is further caused to:
determine whether the document data of the second document has been previously acquired;
in response to determining that the document data of the second document has been previously acquired, prevent acquisition of the document data of the second document; and
in response to determining that the document data of the second document has not been previously acquired, acquire the document data of the second document.

8. The apparatus according to claim 1, wherein the apparatus is further caused to:
upon acquiring the document data of the second document, determine whether other link information is stored in at least a portion of the second document; and
in response to determining that other link information is stored in the at least a portion of the second document, acquire document data for a third document corresponding to and using the other link information stored in the second document.

9. The apparatus according to claim 8, wherein determining whether the other link information is stored in the at least a portion of the second document includes:
receiving a second selection command selecting a second selected area of the second document; and
determining whether the other link information is stored in the second selected area.

10. A non-transitory, computer-readable medium storing computer readable instructions that, when executed, cause an apparatus to:
receive a first selection command to select a part of an area of a displayed first document as a selected area;
in response to receiving the first selection command:
cause display content included in the selected area selected in response to the first selection command to be stored in a storage unit;
determine whether a threshold amount of link information linked to a second document is included in the selected area; and
acquire document data of the second document using the link information in response to determining that the threshold amount of link information is included in the selected area and without requiring user interaction with the link information in the selected area;
execute a web browser having a browser window; and
display a thumbnail corresponding to the acquired document data of the second document together with a thumbnail corresponding to the display content of the selected area of the first document, in one region of the browser window.

11. The non-transitory, computer-readable medium according to claim 10, wherein the apparatus is further caused to:
generate a correlation between the acquired document data of the second document and the display content of the selected area of the first document; and
store the correlation in the storage unit.

12. The non-transitory, computer-readable medium according to claim 10, wherein the link information is included in an object of the first document, wherein the selected area includes at least a portion of the object and at least a portion of the link information, and wherein the apparatus is further caused to:
determine a ratio of the at least a portion of the object to an entirety of the object;
in response to determining that the ratio is higher than a predetermined threshold value, determine that the threshold amount of link information is included in the selected area; and
in response to determining that the ratio is lower than the threshold value, determine that the threshold amount of link information is not included in the selected area and not acquire the document data for the second document.

13. The non-transitory, computer-readable medium according to claim 12, wherein the apparatus is further caused to:
determine a type of the object; and
determine, in accordance with the type of the object, the predetermined threshold value.

14. The non-transitory, computer-readable medium according to claim 13, wherein the type of the object is at least one of an image and text, and wherein the predetermined threshold value corresponds to a first threshold value when the type of the object is text and wherein the predetermined threshold value corresponds to a second threshold value when the type of the object is an image, wherein the first threshold value is larger than the second threshold value.

15. The non-transitory, computer-readable medium according to claim 13, when the type of the object is text, the predetermined threshold value is 100%.

16. The non-transitory, computer-readable medium according to claim 10, wherein the link information is included in an object of the selected area of the first document, and wherein the apparatus is further caused to:
determine whether the document data of the second document has been previously acquired;

in response to determining that the document data of the second document has been previously acquired, prevent acquisition of the document data of the second document; and in response to determining that the document data of the second document has not been previously acquired, acquire the document data of the second document.

17. The non-transitory, computer-readable medium according to claim 10, wherein the apparatus is further caused to:

upon acquiring the document data of the second document, determine whether other link information is stored in at least a portion of the second document; and in response to determining that other link information is stored in the at least a portion of the second document, acquire document data for a third document corresponding to and using the other link information stored in the second document.

18. The non-transitory, computer readable medium according to claim 17, wherein determining whether the other link information is stored in the at least a portion of the second document includes:

receiving a second selection command selecting a second selected area of the second document; and determining whether the other link information is stored in the second selected area.

* * * * *